(No Model.) 4 Sheets—Sheet 3.
O. H. JUDD & C. T. RAWALT.
CORN AND CANE HARVESTER.
No. 276,422. Patented Apr. 24, 1883.
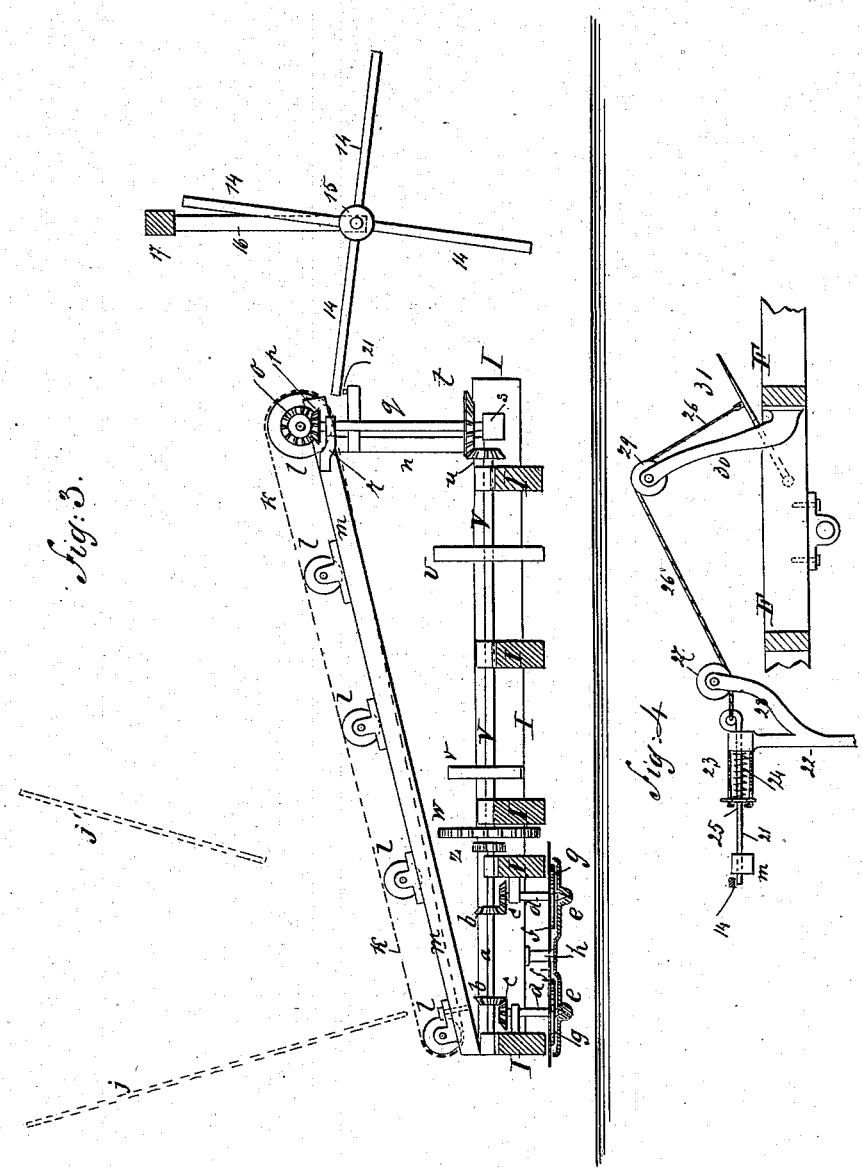
WITNESSES:
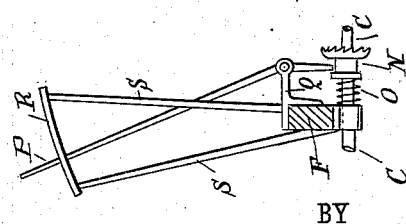
INVENTOR:
BY
ATTORNEYS.

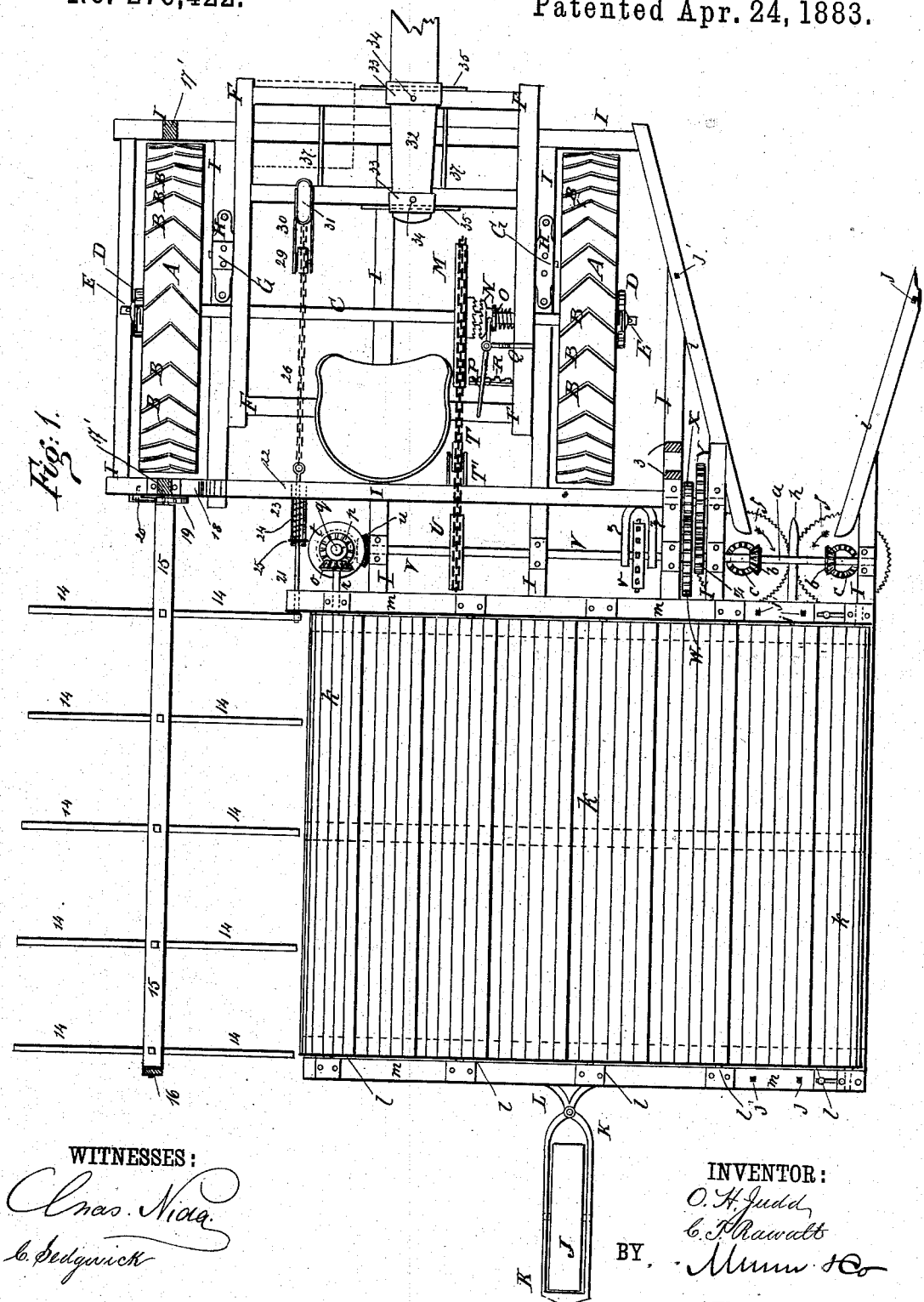

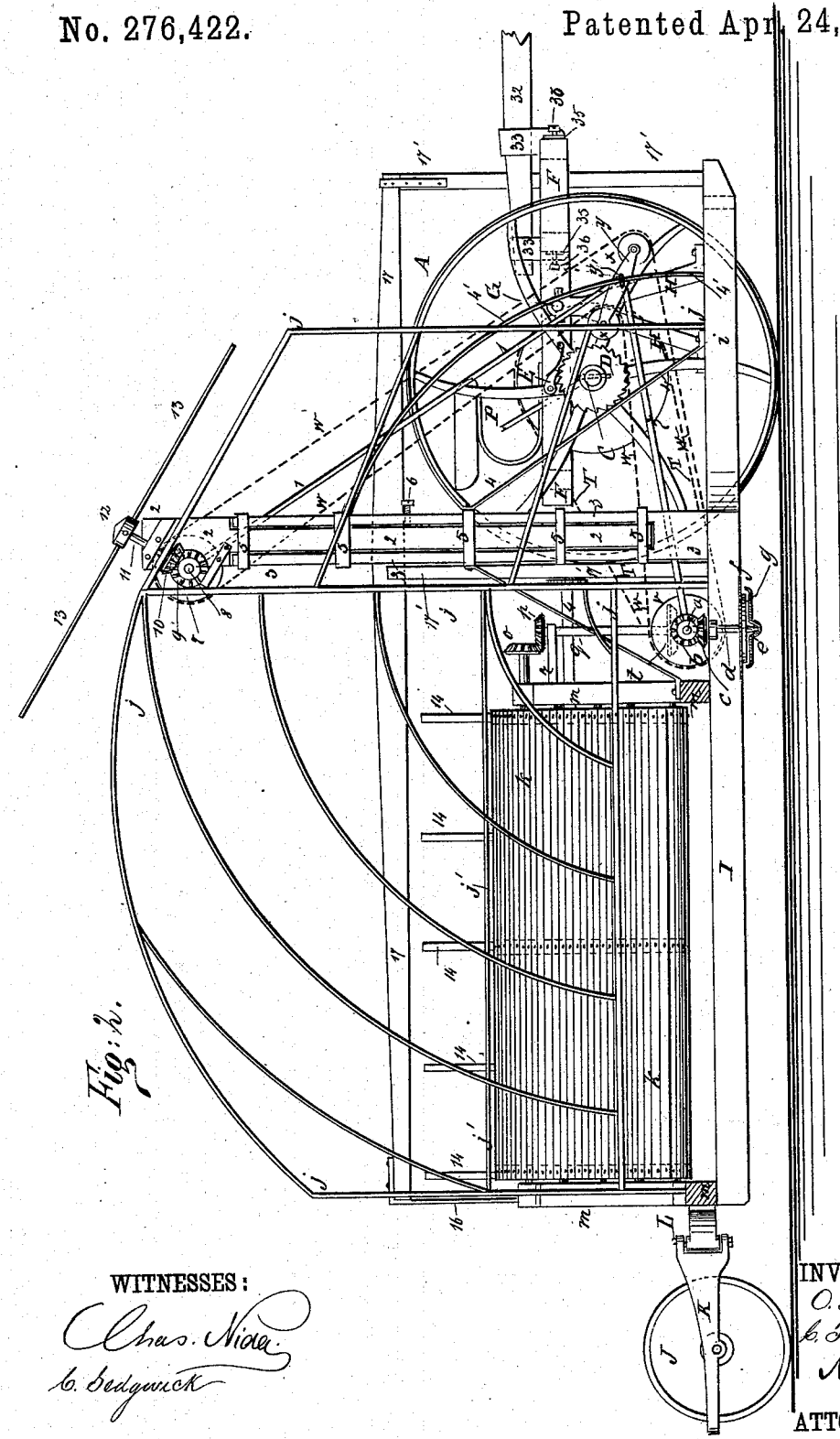

(No Model.) 4 Sheets—Sheet 4.
O. H. JUDD & C. T. RAWALT.
CORN AND CANE HARVESTER.
No. 276,422. Patented Apr. 24, 1883.
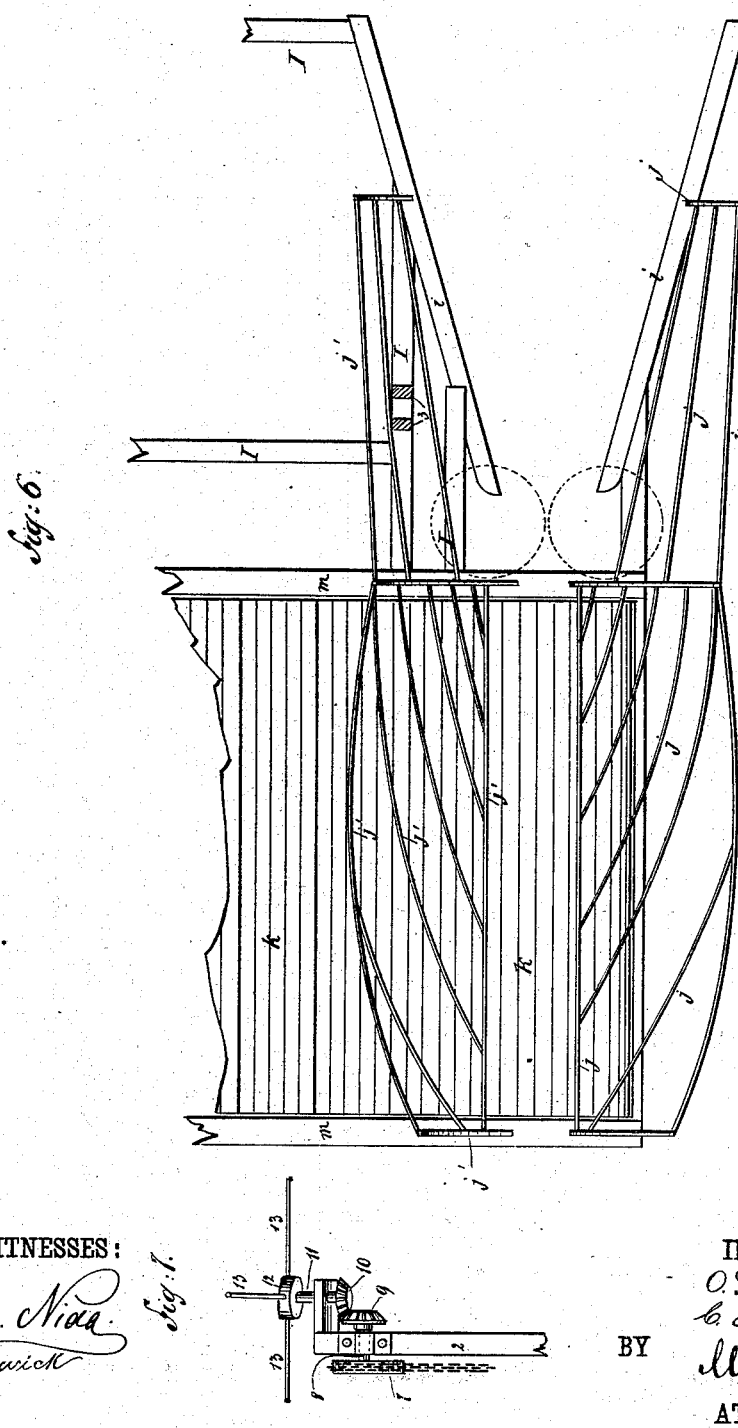
WITNESSES:
Chas. Nida
C. Sedgwick
INVENTOR:
O. H. Judd
C. T. Rawalt
BY Munn & Co.
ATTORNEYS.

UNITED STATES PATENT OFFICE.

ORRIN H. JUDD AND CHARLES T. RAWALT, OF FAIRFIELD, NEBRASKA.

CORN AND CANE HARVESTER.

SPECIFICATION forming part of Letters Patent No. 276,422, dated April 24, 1883.

Application filed August 16, 1882. (No model.)

*To all whom it may concern:*

Be it known that we, ORRIN H. JUDD and CHARLES T. RAWALT, of Fairfield, in the county of Clay and State of Nebraska, have invented certain new and useful Improvements in Corn and Cane Harvesters, of which the following is a full, clear, and exact description.

Reference is to be had to the accompanying drawings, forming part of this specification, in which similar letters of reference indicate corresponding parts in all the figures.

Figure 1, Sheet 1, is a plan view of our improvement, parts being removed. Fig. 2, Sheet 2, is a side elevation of the same. Fig. 3, Sheet 3, is a sectional front elevation taken in front of the drive-shaft. Fig. 4, Sheet 3, is a sectional side elevation, showing the trip mechanism. Fig. 5, Sheet 3, is a sectional elevation, showing the mechanism for throwing the machine into and out of gear. Fig. 6 is a detail plan view of the apron and guide-frames, and Fig. 7 is a detail view.

The object of this invention is to facilitate the harvesting of corn and cane.

The invention consists in the peculiar construction and arrangement of the parts, as hereinafter more fully described, and pointed out in the claims.

A represents the drive-wheels, the faces of which have angular lugs or ribs B formed upon them to take hold of the soil and prevent the said wheels from slipping. The wheels A are placed upon the journals of the axle C, and are made to carry the said axle with them in their revolution by ratchet-wheels D, attached to the said axle C, and with the teeth of which engage pawls E, pivoted to the hubs or spokes of the said wheels A. This axle C revolves in bearings attached to the side bars of the upper frame, F, to the outer sides of which side bars, a little in front of the axle C, are attached gudgeons G to enter bearings in the upper ends of the brackets H. The brackets H, at their lower ends, are securely bolted to longitudinal bars of the lower frame, I, so as to support the forward part of the said frame I. The rear part of the lower frame, I, is supported by the caster-wheel J, the standard K of which is hinged to the bracket L, or other support attached to the rear cross-bar of the frame I, in such a position that the caster-wheel J will be directly in the rear of the right-hand drive-wheel A.

Upon the axle C is placed a loose chain-wheel, M, having clutch-teeth formed upon one end of its hub, with which engage the teeth of the clutch N. The clutch N slides upon the axle C, and is held forward against the hub of the chain-wheel M by a spring, O, placed upon the axle C between the clutch N and the bearing of the said axle C. The clutch N is moved back to throw the chain-wheel M out of gear with the axle C by a lever, P, the end of which rides in an annular groove formed in the clutch N. The lever P is pivoted to a support, Q, attached to the frame F, and its upper part passes through a slot in a bar, R, supported from the frame F by bars S, and provided with notches to receive the lever P, and thus lock the clutch N in place, both when in gear with the chain-wheel M and when out of gear with the said wheel.

Around the chain-wheel M is passed an endless chain, T, which also passes around a chain-wheel, U, attached to the shaft V, and is kept taut by a tension-pulley, T', pivoted to a support attached to the frame I, and which rests upon the said chain. The shaft V revolves in bearings attached to the longitudinal bars of the frame I a little in the rear of the drive-wheels A, and to its end is attached a large gear-wheel, W, the teeth of which mesh into the teeth of the small gear-wheel X, pivoted to the frame I.

With the small gear-wheel X is rigidly connected the large gear-wheel Y, the teeth of which mesh into the teeth of the small gear-wheel Z, attached to the end of the shaft $a$, placed in line with the drive-shaft V, and revolving in bearings attached to the longitudinal base of the frame I.

To the end parts of the shaft $a$ are attached beveled-gear wheels $b$, the teeth of which mesh into the teeth of the beveled-gear wheels $c$, attached to the upper ends of the short vertical shafts $d$. The upper parts of the shafts $d$ revolve in bearings attached to the frame I, and their lower ends revolve in socket or cup bearings in the bar $e$, the ends of which are attached to the frame I. The end parts of the bar $e$ are made wide to serve as shields to the cutters $f$, or have shields attached to them to protect the said cutters. The cutters $f$ are made circular in form, are attached at their centers to the lower parts of the shafts $d$, and are made with smooth or serrated edges, as may be desired, or as the work to be done may require. The cutters $f$ are strengthened by circular washers or re-enforcing plates $g$, attached to their lower sides or to both sides, and which are made of a less diameter than the said cutters, so as to leave the cutting parts of the cutters unobstructed. The adjacent edges of the cutters $f$ project into and nearly meet in a slot in the guard $h$, attached to the frame I, and to which the middle part of the bearing-bar $e$ is attached.

To the frame I are attached bars $i$, which incline from each other as they extend forward, so as to collect the stalks and guide them into such a position that they will be cut by the cutters $f$ against the guard $h$.

To the guide-bars $i$ are attached the forward parts of two guide-frames, $j\ j'$, which thus incline from each other to correspond with the inclination of the said guide-bars. The rear parts of the guide-frames $j\ j'$ incline toward each other from their upper edges downward, as indicated by the dotted lines in Fig. 3, so as to guide the stalks, as they fall, into proper position upon the endless apron $k$ of the carrier. The lower edge of the rear part of the outer guide-frame, $j$, extends down close to the endless apron $k$, and the lower edge of the inner guide-frame, $j'$, terminates at such a distance above the said endless apron $k$, as indicated in dotted lines in Fig. 3, as will allow the stalks being carried up by the said endless apron to pass freely beneath the said lower edge. The endless apron $k$ passes around rollers $l$, which are made with flanged ends to keep the said endless apron in place. The journals of the rollers $l$ revolve in bearings attached to an inclined frame, $m$, and the bearings for the lower roller are slotted to receive the fastening-bolts, so that the said lower roller can be adjusted to tighten or slacken the endless apron $k$. The lower side of the inclined frame $m$ is attached to the frame I, and its upper part is supported from the said frame I by studs $n$. The endless apron $k$ is formed by attaching narrow cross-slats, at a little distance apart, to three or more belts which pass around the rollers, a thicker slat being used every eight or ten inches to prevent the stalks from slipping back upon the apron $k$ while being carried up the inclined frame $m$. The inner journal of the upper roller, $l$, projects, and to it is attached a small beveled-gear-wheel, $o$, the teeth of which mesh into the teeth of the small beveled-gear wheel $p$, attached to the upper end of a short vertical shaft, $q$. The upper part of the shaft $q$ revolves in a support, $r$, attached to the inclined frame $m$, or to a stud supporting the said frame $m$. The lower end of the shaft $q$ revolves in a socket or step bearing in a support, $s$, attached to the frame I.

To the lower part of the shaft $q$ is attached a beveled-gear wheel, $t$, the teeth of which mesh into the teeth of a smaller gear-wheel, $u$, attached to the end of the driving-shaft V, so that the endless carrier-apron $k$ will be driven from the said driving-shaft V.

To the driving-shaft V, near the gear-wheel W, is attached a chain-wheel, $v$, around which passes an endless chain, $w$, (see Fig. 2,) the two parts of which pass around two guide-pulleys, $x$, pivoted to the opposite ends of a bar, $y$, pivoted at its center to the forward end of the bar $z$, and the lower end of the bar 1. The rear end of the bar $z$ is forked, (see Fig. 1,) and is connected with the driving-shaft V by bearings attached to the branches of the said forked end. This construction prevents the forward end of the bar $z$ from having any lateral movement, while allowing it to have a free vertical movement. The upper end of the rod 1 is attached to the upper end of the movable part 2 of an adjustable standard, the lower end of the stationary part 3 of which is attached to the frame I, and which is strengthened in position by inclined braces 4 and a curved brace, 4'. The upper ends of the braces 4 are attached to the stationary part 3 of the standard, and their lower ends are attached to the frame I. The movable part 2 of the standard slides in a slot in the stationary part 3, is kept in place by bands or straps 5, attached to the said stationary part 3, and is secured at any desired elevation by set-screws 6, or other suitable means.

From the guide-pulleys $x$ the endless chain $w$ passes to and around a chain-wheel, 7, attached to a short horizontal shaft, 8, which revolves in bearings attached to the upper ends of the movable part 2 of the extension-standard.

To the shaft 8 is also attached a small beveled-gear wheel, 9, the teeth of which mesh into the teeth of the small beveled-gear wheel 10, attached to the short shaft 11. The shaft 11 revolves in bearings attached to the upper end of the part 2 of the extension-standard, and inclines forward, as shown in Fig. 2.

To the upper end of the shaft 11 is attached a hub, 12, to which are attached the inner ends of four or more slightly-curved arms, 13, which, as the machine is drawn forward, take hold of the tops of the stalks and push them back between the guide-frames $j\ j'$. With this construction the reel 12 13 can be raised or lowered by adjusting the standard 2 3, the reel-driving endless chain $w$ being kept taut by the action of the hinged bars $y\ z\ 1$ and the guide-pulleys $x$, and being kept in place by the guide-eye $y'$, attached to the bar $y$, and which receives and slides upon the curved brace-bar 4', as shown in Fig. 2. As the stalks fall from the endless apron $k$ at the upper end of the carrier they are received upon the arms 14 of the dropper, where they are carried until a sufficient quantity has been collected for a bundle, when they are dropped to the ground.

The dropper is formed by attaching four rows of radial arms 14 to a shaft, 15, the rear end of which revolves in bearings in the lower end of a hanger, 16. The upper end of the hanger 16 is attached to the rear end of a bar, 17, which passes forward over the dropper-shaft 15 and over the left-hand drive-wheel A, and is securely attached to the upper ends of two upright bars, 17', the lower ends of which are firmly attached to the front and rear cross-bars of the frame. By this construction the rear end of the dropper is left free, so that there will be nothing to obstruct the fall of the stalks, however long the said stalks may be. The forward end of the shaft 15 revolves in bearings in a support, 18, attached to the frame I, and to the said end is attached a ratchet-wheel, 19, with the teeth of which engages the pawl 20, pivoted to the support 18, to prevent the dropper from turning back. The dropper is held in place while receiving the stalks by a pin, 21, upon the upper side of the end of which rests the end of the arm 14 at the inner end of the row that is receiving the stalk. The pin 21 slides in a bearing in the projecting end of the forward inclined bar of the carrier-frame m, or a bar attached to the said frame in a standard, 22, attached to the frame I, and in a guide-tube, 23, attached to the said standard. The pin 21 is held forward by a spiral spring, 24, placed upon it within the tube 23, by which the said spring is covered and protected. One end of the spring 24 rests against the standard 22, and its other end rests against a cross-pin, 25, passed through the trip-pin 21, and the ends of which project to enter guide-slots in the end of the tube 23, so that the trip-pin cannot be drawn back any farther than to release the dropper 14 15. The forward movement of the trip-pin 21 is limited by the head of the said pin coming in contact with the standard 22.

To the head of the trip-pin 21 is attached the end of a chain, 26, which passes under a guide-roller, 27, pivoted to an arm, 28, attached to the standard 22, over a guide-pulley, 29, pivoted to the standard 30, attached to the frame F, and its other end is attached to a foot-lever, 31, pivoted to the frame F in such a position that it can be readily reached and operated by the driver. With this construction, when enough stalks have been collected upon the dropper 14 15, the driver with his foot operates the lever 31 to draw back the trip-pin 21, and allow the dropper to be turned by the weight of the collected stalks and drop the said stalks to the ground. As the dropper 14 15 begins to turn, the driver releases the lever 31, and the spring 24 instantly forces the pin 21 forward to receive the arm 14 of the next row, and thus stop the dropper 14 15 in position to again receive stalks from the endless apron k.

32 is the tongue to which the draft is applied, and by means of which the machine is guided. The rear end of the tongue 32 is inserted in the bands or keepers 33, where it is secured in place by pins 34, passing through the said bands and tongue. The bands 33 have flanges upon their lower sides, which overlap the metal plates 35, secured to the opposite sides of the two forward cross-bars of the frame F. The plates 35 and the cross-bars of the frame F have a number of holes formed in them to receive the screws 36, that fasten the flanged bands 33, and with them the tongue 32, in place. With this construction, by loosening the screws 36 the tongue 32 can be readily adjusted to balance the side draft of the machine. The connection between the metal plates 35 and the cross-bars of the frame F is strengthened by the tie-rods 37, which pass through and are secured to the said bars and plates.

The drive-wheels A are placed at a distance apart equal to the distance apart of the rows of stalks, so that the said wheels will travel in the spaces upon the opposite side of the row adjacent to the row being cut.

The dropper 14 15 is arranged directly in the rear of the left-hand drive-wheel A, so as to drop the bunches of stalks in the space in which the said left-hand wheel travels.

The above-described improvement in the traction-wheels of cane and corn harvesters to prevent them from slipping on the ground, and the means described whereby the tongue can be laterally adjusted to prevent side draft, form no part of the subject-matter of this application, and we hereby reserve the right hereafter to make separate and independent applications for these inventions.

Having thus fully described our invention, we claim as new and desire to secure by Letters Patent—

1. In a corn and cane harvester, the combination, with the upper frame, F, axle C, having its bearings therein, and wheels A, of the lower frame, I, suspended from the upper frame by the brackets H, rigidly secured at their lower ends to the lower frame, I, and hinged to the upper frame, F, and caster-wheel K, hinged to the lower frame, substantially as described, and for the purpose set forth.

2. In a corn and cane harvester, the combination, with the suspended frame I, the two short vertical shafts d, and their driving mechanism, constructed and operated substantially as described, of the two rotary cutters f, entering the slotted intermediate guard, h, and the bearing and shield bar e, substantially as herein shown and described, whereby the stalks will be cut as the machine is drawn against them, as set forth.

3. In a corn and cane harvester, the combination, with the frame I, the inclined guide-bars i, and the endless apron k, of the guide-frames j j', having their forward parts inclined from each other and their rear parts inclined toward each other downward, the guide-frame j extending downward to near the upper face of the endless apron, and the guide-frame j' terminating at a distance above said endless apron, substantially as herein shown and described, whereby the stalks are guided to the cutters, and then to the said endless apron, as set forth.

4. In a corn and cane harvester, the combination, with the frame I, the guide-frames j $j'$, the driving-shaft V, and its driving mechanism, of the chain-wheels and chain $v\ 7\ w$, the beveled gear wheels 9 10, the reel 12 13, and the adjustable standard 2 3, substantially as herein shown and described, whereby the upper parts of the stalks are pushed into the space between the guide-frames, as set forth.

5. The combination, with the endless apron $k$, of the guide-frames $j\ j'$, having their forward parts inclined from each other and their rear parts inclined toward each other, as set forth, the guide-frame $j$ extending downward to near the upper face of the endless apron, and the guide-frame $j'$ terminating at a distance above said endless apron, substantially as described, and for the purpose set forth.

6. In a corn and cane harvester, the combination, with the endless apron $k$ and dropper 14 15, of the standard 22, trip-pin 21, slotted tubular case 23, stop-pin 25, spiral spring 24, chain 26, pulleys 27 29, and pivoted foot-lever 31, substantially as described, and for the purpose set forth.

ORRIN H. JUDD.
CHARLES T. RAWALT.

Witnesses:
   EDGAR W. LEWIS,
   OLIVER P. ALEXANDER.